INVENTORS
George J. Lorant
Murray L. Rollins
Donald C. Guterman
BY

ATTORNEYS

United States Patent Office 3,203,111
Patented Aug. 31, 1965

3,203,111
APPARATUS FOR PRODUCING DEHYDRATABLE BABY FOODS
George J. Lorant, Murray L. Rollins, and Donald C. Guterman, Albion, N.Y., assignors to General Foods Corporation, White Plains, N.Y., a corporation of Delaware
Filed June 4, 1959, Ser. No. 818,092
1 Claim. (Cl. 34—85)

This invention relates to a novel apparatus for producing dehydrated pureed food products which may for example be suitable for feeding infants and adults requiring geriatric or postoperative care; and which may be generally useful in the preparation of soups, deserts, and other food preparations. More particularly, the invention relates to an apparatus which permits the manufacture of dehydrated strained food products which may have a relatively high percentage of natural or added sugars and/or pectinous substances; which may be readily rehydratable in cold tap water, milk or other aqueous liquids; and which, when frozen in a relatively dehydrated condition, may be free from agglomeration whereby a free-flowing readily handled product is obtained.

In the art of preparing so-called dehydro-frozen fruits such as pears, peaches, apples, apricots, tomatoes, cranberries, and the like, in the form of a puree it is desirable that the product have the ability to rehydrate "instantly" and completely; in this connection the term "instantly" is used to describe a product capable of rehydrating in about 30 seconds and ranging anywhere from a period of a few seconds to one minute, which hydration can take place in a cold, lukewarm, warm, or boiling water or other aqueous liquid and is accompanied by a rapid increase in viscosity.

Heretofore, in recognition of the economies offered in terms of reduced package weight and volume, proposals have been made for processes to reduce the moisture content of fruits by dehydro-freezing them. Most dehydro-freezing practices involve a relatively slow drying operation, during which operation, certain factors are operative to impair the desired rehydration characteristics of the product. Typical of such slow dehydration procedures are processes employing so-called tunnel or truck dehydrators which have been used for many years to dehydrate vegetables and fruits. For the drying of fruit purees, more rapid and economical drying may be effected by passing a slurry of puree onto a revolving drum, the outer surface of which is heated and which offers a drying interface having good heat transfer and particle release properties capable of increasing the solids content of the puree from say 9 to 30% up to about 98 to 90% solids (i.e. lowering the liquid content from say 70%– 91% down to about 2%–10%) but preferably not above that solids level where flavor, color, and nutrition suffer.

In carrying out such a drum drying operation, a number of difficulties are encountered which tend to impair the rehydration characteristics of the dried product. The partially dehydrated film of product is plastic at the point of removal from the drum and when removal is effected by a doctor blade tangentially engaging the smooth surface of the drum, there may be a build-up of product on the doctor blades such that as the product is removed from the drum, it assumes a wavy irregular surface of somewhat crepe-like appearance due to the deceleration of the film as it leaves the dryer. Build-up of this thickness of product is adverse to rapid rehydration of the doctored product.

Heretofore prior art drum drying practices have been concerned with the problems involved in protecting the product doctored from a drum dryer against overheating. Thus, in conventional prior art techniques it has been suggested that a blast of cold air be directed at the doctoring or scraping point or that the continuous film of product doctored from the drying surface be rapidly removed from the vicinity of the drying surface. However, such prior art practices fail to endow the continuous film thus dehydrated with any substantial rehydration or reconstitution properties. Such prior art is only concerned with maintaining a substantially continuous unbroken web or film consistent with good uninterrupted manufacturing practice such that a minimum of downtime will arise from film breakage.

It is also a feature of prior art drum drying systems, which are intended to be used to dry films of e.g. foods, that the continuous film traverses a great distance typically greater than three feet and usually 3 to 4 feet from the point of removal (i.e. the doctoring point) to the point at which it first touches any subsequent conveying rolls. When the film, as withdrawn from the drum, is quite hot as it commonly is, prior art pieces of apparatus have attempted to cool it as quickly as possible and this has been done by providing a greater distance between the doctor point and the point of first contact with subsequent conveying rolls.

It has long been appreciated that the various techniques and prior art pieces of apparatus which have been employed are deficient in that they fail to permit attainment of a product which is readily rehydratable. Various modifications of the apparatus have been made, and much thought has been given to the design of apparatus by those skilled-in-the-art, but no apparatus has heretofore been devised which permits attainment of the desired product possessing the superior characteristics hereinbefore noted.

It is an object of this invention to provide an apparatus which permits attainment of a stretched puree characterized by unexpectedly superior rehydration characteristics. Other objects will be apparent to those skilled-in-the-art on inspection of the following description and drawings.

In accordance with certain aspects of this invention, the apparatus for producing a dry stretched film may comprise a drying surface on which a continuous film of material may be deposited, means for drying the film on said drying surface to a stretchable state, means for removing said film from said surface as a continuous film, means for subjecting said removed continuous film to tension substantially in excess of that required to prevent agglomeration during removel, sufficiently great to stretch the film, sufficiently great to impart a random distribution of discontinuous surface failures and void spaces throughout the film, and less than the failing tension of the film, and means for positively maintaining said tension during said removal to effect stretching of said film while it is in stretchable condition.

It is a particular feature of the apparatus of this invention that it permits subjecting the film to tension over a short distance (between the doctor point and the first contact with the stretch roll) which distance is as short as possible, preferably less than 3 ft., down to e.g. 8 in., and typically 1 to 1.5 ft. Preferably this stretch distance is in a horizontal plane. Because of the controlled short distance of travel of the film, it may be maintained at a controlled, preferably warm, temperature to insure proper plasticity during stretching.

The novel apparatus of this invention, according to certain of its aspects, may include a drying surface on which a continuous film of material may be deposited. This may preferably be a drum dryer wherein the drying surface is the surface of a right-cylindrical drum which is adapted to rotate about its axis which lies in a horizontal plane. Although a single drum dryer or a twin drum dryer may be employed, it is preferred to use a double drum dryer wherein the drums rotate toward each other at the top.

The rotating drums will be preferably heated as by provision therein of appropriate coils or conduits for passage of appropriately heated air, steam, or hot water. In the preferred embodiment, the apparatus will be fabricated to permit heating by steam or hot water.

The feed to the apparatus of material to be dried will be in liquid phase, commonly as a slurry, and it may be delivered to the outside of a heated drum by positioning a drum so that a portion thereof is immersed in a pool of the liquid or by passing the liquid over appropriate spreading devices onto a drum. Preferably, however, when the rotating double drum dryer is employed, the liquid may be fed by means of an appropriate conduit to a pool of liquid maintained between the drums, the drums being positioned sufficiently close together to maintain the pool. As the drums rotate, a portion of the liquid passes through the pinch between the drums and forms on the drums a thin film of the order of 0.01 in. thickness. This film is carried around on the drying surface of the drum during which time it is dried by the heat originating inside the drum. Typically the moisture content may be lowered from the charge moisture of about 65% to a dry moisture content of about 15%.

The so-dried stretchable film may be removed from the rotating drum dryer by appropriate peeling or scraping means. Commonly a doctor blade which may for example be positioned with its cutting edge approximately tangential to the surface of the drum, may be employed to remove the stretchable film from the drum dryer as a continuous film.

The continuous, partially dried, stretchable film is preferably conducted away from the point of removal from the drum by means for subjecting the removed continuous film to a tension which is (a) substantially in excess of that required to prevent agglomeration during removal, (b) sufficiently great to stretch the film, (c) less than the failing tension of the film, and (d) sufficiently great to impart a random distribution of discontinuous surface failures and void spaces throughout the film. During this removal, the film will be stretched or elongated.

Preferably this stretching is effected by a stretch roll which in the preferred embodiment may be a cylinder adapted to rotate along an axis parallel to the axis of rotation of the drum dryer, and to rotate in the direction of travel of the partially dried stretchable film which is drawn off the dryer.

The circumferential speed of the stretch roll is sufficient to provide the hereinbefore noted tension in the film. Although it may be possible to mechanically interlink the stretching roll with the rotating drum dryer and even to permit the two to rotate at the same r.p.m., it is preferred to drive the stretch roll independently. The stretch roll may be larger or (preferably) smaller than the drum dryer, but in any case it will rotate at an appropriate speed to insure that its circumferential velocity is sufficiently great to impart to the film the degree of stretch herein noted.

In the preferred embodiment, the stretch roll will possess a frictional or roughened surface which creates friction when the stretchable film passes thereover. The roughened surface may be foraminous i.e. it may be a more-or-less flat surface containing a plurality of perforations; preferably, however, it may be reticular and in the preferred embodiment, the surface of the stretch roll may include sections of expanded metal lath or chicken wire which may, if desired, be supported on a foraminous metal surface.

The take-away or stretch roll may be suitably equipped to apply suction to the contacting face of the sheet passing thereover thus insuring a positive travel of product in accordance with the peripheral speed of the roll or reel and incidentally withdrawing both heat and moisture; such a modification may comprise a roll having a plurality of perforations communicating with a vacuum so as to provide means whereby suction is applied at the periphery of the roll only at the arc of contact required to effect the desired tension.

It is a particular feature of this invention that the preferred embodiment of the apparatus includes a rider wheel or pressure wheel which insures sheet travel commensurate with the peripheral speed of the stretch roll, such action being insured by positive contact against the stretch roll as provided by riding wheels of such size, number, and placement to provide a gentle gripping contact. While such riding rolls may be idler wheels, other means will doubtless occur to those skilled-in-the-art.

The riding, pressure, or idler wheel may be variously constructed depending upon the particular material being treated. It may be a single cylindrical roll or a series of spaced shorter rolls; it may be more-or-less rigidly mounted or it may be mounted in a spring-loaded bearing to thereby resiliently ride on the stretch roll.

The apparatus of this invention may be employed in the art of drying purees, puddings, and similar products having a relatively high proportion of natural or added sugars and/or pectinous substances initially present, added or liberated in cooking. This novel apparatus permits attainment of an instantly rehydratable product in film or flaked form; for ease of reference the materials to be processed by the apparatus of this invention will be referred to hereinafter as "purees," but will be understood to encompass soup stocks, slurries, and solutions containing solid particles, all of which compositions tend to form continuous stretchable films rather than a powder upon removal in a concentrated form from a drying surface. The apparatus of this invention may be employed in a process which comprises applying a puree having a solids content usually in the order of 9–30% (but sometimes higher) to a smooth surface whereon the puree is heated, partially dehydrated, and converted into a film having a syrupy viscous elastic condition while in the heated state; in this condition, finely divided food solids are suspended in a molten liquefied sugar and/or pectin-like carrier which supplies to the film a certain minimum tensile strength varying from product to product, but sufficient to permit the product to retain a continuous cohesive nature. Films of apple, and to a lesser degree peach purees, will have a much greater tensile strength than pudding films due to the higher preponderance of pectinous material in the fruits. This film is continuously stripped under tension from the aforesaid heating surface, which stripping is preferably effected by such means as a doctor blade. In general the moisture content of the film removed by means of a doctor blade or other suitable means will be less than 12% and higher than 2% by weight of the film. This film is continuously stripped under tension with care being exercised to avoid agglomeration at the point of film removal, a tendency likely to occur at the doctor blade.

Upon striping, the film is subjected to tension substantially in excess of that required to prevent agglomeration at the doctor blade and below that tension at which the film will fail as evidenced by complete breaking or fracture resulting in interruption of the continuity of the film; the tension should be sufficient to thinly and discretely disperse food solids in the still molten carrier therefor to produce a film of optimal thinness. In general, this condition will be evidenced by a random distribution of openings, surface failures and void spaces throughout the film and will also be manifest in most products by minute blistering or puffing barely visible to the unaided eye, giving rise to a plurality of postules some of which are broken and some of which are substantially intact.

Under a miscroscope the stretched cooled product can be seen to comprise a translucent base layer or phase holding dispersed solids with a majority of the surface of the film being comprised of translucent areas of microcrystalline sugars. It is characteristic of the present process that stretching tension which is applied is sufficiently great to increase the ratio of the surface area of the stripping film to its weight to a point substantially above that prevailing in the case of an unstretched film but also above that point at which substantial discontinuous film-surface rupture occurs.

Hence, the tension employed in accordance with the present invention for removal of the film from the heating surface is well in excess of that normally required to prevent agglomeration of the product and rapid removal of the film from the drying surface. Not only is stretching of the striped film carried out under conditions sufficient to induce discontinuous small ruptures indicating a loss of elasticity at spaced points, but also whereat gas or vapors generated in the heated drying zone are effective to cause a blistering or puffing of the continuous translucent phase. Such an expansion will contribute to the evaporative cooling of the thin film of material.

Stretching as herein described in detail may be carried out by a positive controllable means for accelerating the rate of travel of the stripped film relative to the rate of film travel prior to stripping. Because of the desired film characteristic such stretching means must be capable of creating such a rate increase uniformly without inducing excessive tension while assuring the creation of sufficient tension to establish and maintain a high degree of dispersion of food solids throughout the molten carrier therefor.

By virtue of the condition of the flake created by stretching, there is an ideal distribution of the water soluble and water insoluble food solids within the flake with the flake displaying attractive colors and offering fresh flavors. The water soluble food solids comprise a continuous phase which is substantially crystalline, with the water insoluble solids being thinly and discretely dispersed therein as a discontinuous phase. It is a distinct feature of the product of the present invention that a major portion of the surface of this thin cooled flake is comprised of said continuous phase in a microcrystalline state, said major portion being established by the supercooling effect incident to the novel stretching action which is also accompanied by minute crater-like ruptures. By virtue of this arrangement and condition of water soluble and water insoluble food solids, the water soluble solids will go into solution quickly in cold water but not at the expense of the water insoluble solids which are ideally dispersed and have the greatest opportunity to rehydrate.

The flakes produced from the film will be broken into various sizes depending upon the rehydration characteristics of the particular puree being dried. For most fruit purees and puddings the film will preferably be flaked into a particle size whereat 100% of the product passes a 10 mesh U.S. Standard screen (0.027" wire), although even larger size flakes may be produced with acceptable rehydration properties. In general, the film without further treatment according to our process, should not be broken up to a very fine particle size, viz., below a 40 mesh sieve, since in breaking up the film the particles tend to lump during handling or storage into a candy-like ball which will not hydrate instantly in cold water.

The importance of the foregoing stretching will be appreciated when it is considered that in the case of a plastic and yet stretchable film which is not stretched to the degree and in the manner contemplated herein and from which sensible heat is allowed to dissipate, a puree will have relatively poor rehydration characteristics, viz., 3 to 10 minutes is required when the product is reconstituted in cold or luke warm water (40 to 80° F.). In the case of the aforesaid stretched film and the flake product, the product has rehydration characteristics which may be termed "instantaneous" and broadly speaking has the ability to reconstitute in cold to luke warm water (40 to 80° F.) in less than 60 seconds depending upon the product, usually 1 to 30 seconds. Apple purees are the fastest in rehydration, this phenomenal rehydration being manifest in the form of a "blossoming" of the product upon reconstitution in water. In the case of pears a slight delay in the order of say 5 seconds is observed before such blossoming occurs. In any event, the foregoing rehydration characteristics prevail in a wide variety of fruits, and the term "fruit" as it is employed in the accompanying claims is intended to cover any plant having a high natural sugar content, say in the order of 13% by weight of solids, and represented by such common fruits as apples, cranberries, peaches, pears, apricots and the like.

The term "stretchable" as it is employed in the foregoing statement and in the accompanying claims is intended to describe that plastic condition which prevails when the puree has been reduced to a moisture content generally in the neighborhood of more than 90% solids and ranging anywhere between 90 to 98% solids, the upper range of moisture content being limited by the characteristics of the plastic state as well as the characteristics of the product itself which at an unduly high solids content can be deteriorated by excessive heat treatment; in general, it has been observed that moisture between 2 to 10% in the stretchable mass are desirable but still higher moisture content in the order of 15% can also be practiced while carrying out the present invention; for natural fruit purees not having additives therein a moisture content in excess of 10% will be characterized as soupy; however, modifying thickening agents such as starches, gums, dextrines, and the like, detailed hereinafter and capable of increasing the tensile strength of the puree, will of course alter the moisture content at which this desired stretchability will be found to prevail. In the preferred embodiment, the degree of stretching which should be practiced is that sufficient to stretch the product to the extent that a plurality of minute surface ruptures appear on the film surface.

Stretching is achieved preferably by causing the hydrous film of product to travel in a substantially uncompressed fashion over take-up means operating to cause the film of material to travel (in its path between the film-forming surface and the take-up means) at a rate greater than that at which it is removed from the heated film-forming surface.

To effect proper subsequent film flaking, control of product moisture and/or temperature is essential, depending to a great extent on the nature of the material being treated. The product should be in a friable, crisp condition and should remain in this condition after flaking to preserve its free-flowing "instantly" rehydratable character. This friable condition is induced and maintained by subjecting the stretched concentrated curtain of product to controlled atmospheric temperatures and humidities.

Products passing from the stretching means under varying operating conditions may or may not have been cooled to a temperature and adjusted to a moisture content whereat the curtain of solids can be readily flaked under normal atmospheric conditions to yield instantly rehydratable material. Under conditions of high relative humidity certain products, typically many of the fruit purees mentioned above and puddings, will absorb atmospheric moisture due to their hygroscopic character. Other products such as applesauce and tomato paste, even under ideal atmospheric conditions, i.e., low wet bulb temperatures, will require further downward adjustment of product moisture content. Even when a curtain of product has been dehydrated to a point where it will flake properly, i.e. will not ball-up in handling by a conveyor, there will be situations calling for reduction of temperatures also, even though substantial temperature reduction takes place in the course of stretching the product.

To illustrate, applesauce puree will be stripped from the dryer at 7% moisture and in a stretched cool condition at about 5% moisture can be flaked. Nevertheless, under atmospheric conditions of high relative humidity and temperature, the same product removed from a drying roll at a much lower moisture than 7% and having when stretched an even lower moisture content than 5% will not flake effectively and retain its free-flowing and rehydratable properties after storage unless the curtain of product is subjected to a dehumidified air and preferably refrigerated dehumidified air. These latter experiences will for the most part be encountered at relative humidities above about 60%.

Broadly the film of product to be stretched will have a moisture content ranging between 2 to 7% before stretching (generally about 4.5%) and a moisture content ranging between 3 to 5% after stretching (generally below 4.5%). It is preferred where products contain a high percentage of sugars, starches, and acids, to chill the curtain of product by use of recirculated cooled air at a temperature below 70° F. and at a relative humidity below 45%, although as noted above some acceptable products can be obtained when employing slightly higher relative humidities and air temperatures. Where the products being processed are fruit purees and puddings, unchilled flakes thereof stored in a room having an air temperature, say in the order of 70° to 10° F. tend to become lumpy and unworkable in a span of about 24 hours. Thus, it is a very distinct advantage and necessary for most fruit purees to employ conditions under which the product has a temperature well below 32° F. as it is introduced to a flaker and well below 40° F. as it leaves the flaker since after the product will be free-flowing and perfectly workable after being stored under refrigeration, thereby offering foodstuffs which can be stored in bulk and later packaged as the need arises.

In accordance with a preferred chill flaking technique which may be used to further treat the dehydrated stretched films obtained by use of the apparatus of this invention, ordinary refrigeration means using recirculated dehumidified air at less than 30° F. dehumidifies as well as cools the product to the desired extent prior to flaking. On the other hand, other means may be employed to effect such treatment continuously during flaking and a preferred modification of apparatus to be described hereinafter is a screw conveyor which is enclosed but for a port of entry to the screw, a source of recirculated dehumidified cool air being introduced to the enclosed conveyor countercurrent to the movement of product; in such conveyor means the curtain of product will be somewhat broken but the flaking operation will occur when the product is delivered to a flaker which is also enclosed and is located downstream from the conveyor. The flaker may comprise any suitable well known flaking apparatus capable of breaking a sheet of product and passing it through a screen; such a flaker usually employs a series of driven paddles which force the product through a screen of a Standard sieve size generaly finer than 40 mesh.

Thereafter the product can be stored in a suitable refrigerated atmosphere or packed directly either in an inert gaseous atmosphere or under normal atmospheric pack. Thus, the product may be packaged in sterile airtight containers such as tin cans in an inert gaseous atmosphere, e.g., nitrogen. However, a far less expensive packaging system which is ideally and peculiarly suited to the stretched flaked purees of the present invention is the packaging and sale of these products in a frozen condition (0° F.) in any conventional frozen food package.

The purees which may be treated by the apparatus of this invention may be compounded from comminuted fruit solids and fruit juices and mixtures thereof which it is possible to combine with vegetable solids and juices, meat solids, and comminuted vegetable-meat mixtures if desired, most of which in a concentrated condition lend themselves to the stretching technique of the process of the instant apparatus.

The puree may also be composed of other comestibles such as puddings high in starch and sugar levels and possessing a tacky, stretchable, viscous nature; in this latter category of materials various flavored puddings, such as vanilla, chocolate, orange and the like will be most suitable, the starch of such compositions being potato, tapioca, arrowroot, sago, corn, etc., either gelatinized or partially gelatinized. Overall, a substantial fraction of the non-aqueous constituents of the pudding puree will be starchy in nature or origin and will have been gelatinized to a gel-like consistency by reason of the heat treatment the puree undergoes as its solids content is increased on the drum to render the puree film-forming and stretchable.

Typical of these useable thickening materials which are starchy in nature, but not in origin as the term is commonly understood, are polysaccharides and cellulosic ethers, such as pectin, algin, Irish moss extract, gum arabic, gum acacia, alkali metal salts of carboxymethyl cellulose (CMC) and other non-ionic ethers of cellulose, the ionic ethers of cellulose, such as ethyl cellulose, methyl cellulose, methyl ethyl cellulose, hydroxy propyl methyl cellulose and hydroxy ethyl cellulose. The present process contemplates that puree compositions can also be obtained by blending one or more of the foregoing gelatinous polysaccharides with proteinaceous materials of animal or vegetable origin, preferably isolated in a gellable heat denaturable condition; e.g., alkali or ethanol extracted soy protein, peanut protein, fish protein, and the like.

The greatest utility for the apparatus of the present invention is in producing goods intended for infant and geriatric feeding where the facility of use and the desirable appearance and flavor as well as the likeness to fresh fruit are pleasing to the palate. Included in the term "fruit" are tomatoes, pears, apples, apricots, peaches, prunes, cranberries and similar fruity materials; mixtures of such fruits will also be found useful and pleasing in taste, e.g., apple-apricot, pear-apple, etc.

Products acceptable as junior foods or soups may also be produced in accordance with the present invention. Thus concentrated soups of tomato, asparagus, pea and the like may be produced from the cooked pureed vegetable. Many of these vegetables will not have an inherent elastic nature such that they would ordinarily have the stretchable character herein described. However, many of these materials do contain natural pectinous or pectinlike materials, e.g., cooked tomato paste, which are sufficiently elastic in a concentrated pureed form to be stretched as a film into products having the foregoing characteristics; for those materials which do not possess sufficient inherent elasticity, thickening materials of the type described hereinabove may be added to the puree prior to its concentration to a viscous state, such that films thereof may be stretched.

Typical of other materials which may be similarly processed are those containing a substantial proportion of fat associated either with meat or dairy products such as milk or butter. In such cases mixtures of starch, vegetables, fruits, and/or meat solids with such fatty constituents will offer a tacky, elastic quality to a concentrate doctored from a suitable drying surface and the concentrate can be elongated to a film of reduced thickness and will cool rapidly. The product resulting from such stretching, for example, a puree composed of carrots, bacon, celery, and rice flour will be found to be stretchable under the conditions herein specified and will be found to be instantly reconstitutable.

One specific embodiment of the apparatus of this invention is disclosed in the drawings (in which the apparatus is shown together with other apparatus for preparing the desired product) wherein.

Figure 1:
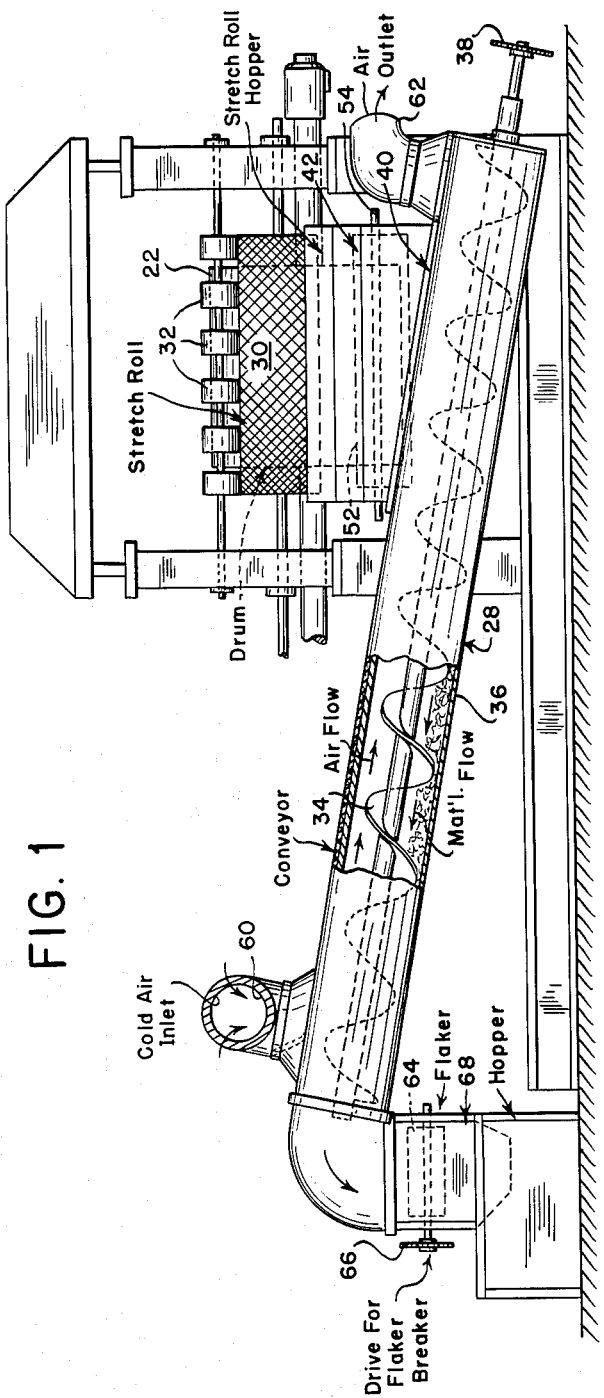
FIGURE 1 is a schematic side elevation with parts in section of an apparatus in accordance with this invention.
Figure 2:
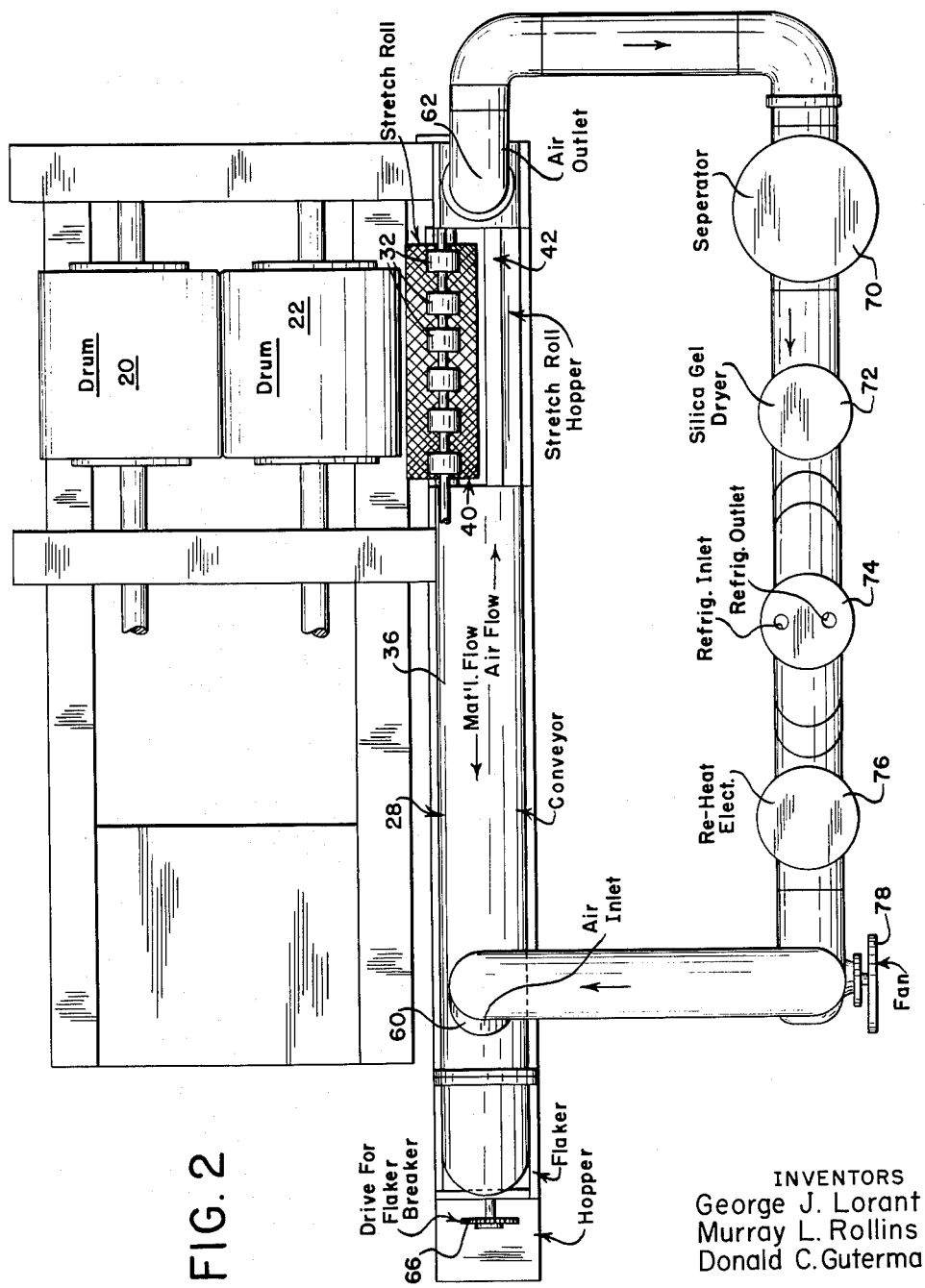
FIGURE 2 is a schematic plan view of the apparatus of FIGURE 1.

A preferred embodiment of this invention is shown in FIGURES 1 through 4 wherein the apparatus comprises a double drum dryer having two cylindrical drums 20 and 22, each adapted to rotate about its horizontal axis. The drums 20 and 22 are closely positioned; the distance between the most closely approaching portions of the surfaces may be varied, but it may commonly be maintained at about 0.006 to 0.0150 inch. The drums 20 and 22 in this embodiment were chrome-coated drums 24 inches in diameter and each had an effective heating or drying surface of 25 square feet.

Each drum 20 and 22 was fitted with internal heat exchange conduits (not shown) to permit passage of heating medium, typically steam, therethrough and to thereby heat the peripheral surface thereof. Each drum was also provided with drive means to permit the drum to rotate about its horizontal axis at a rate which could be varied but which could conveniently be maintained in the range of 0.1 to 10.0 r.p.m., more typically 2 to 5 r.p.m.

Each drum is preferably provided with a means for removing the film therefrom as a continuous sheet, and this preferably is a doctor blade, generally designated 24. The blade 24 may be positioned so that its cutting edge is substantially tangential to the peripheral surface of the drum 22 (and a second blade similarly positioned on drum 20). Each doctor blade will also preferably be so positioned that the film which it removes may have been on the drum for a time sufficient to dry the film to a stretchable condition; typically this may mean that the film may be on the drum for e.g. 225° of revolution of the drum.

Figure 3:
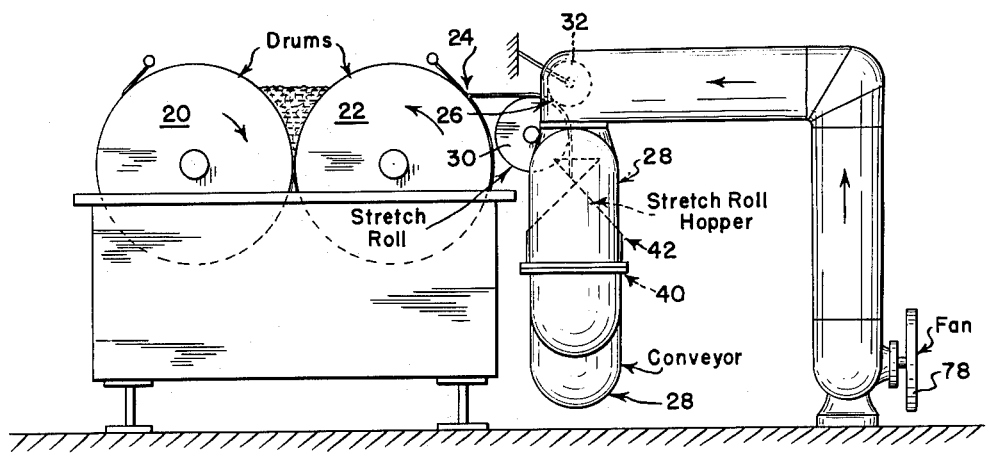
FIGURE 3 is a schematic end elevation of a modification of the apparatus of FIGURE 1.
Figure 4:
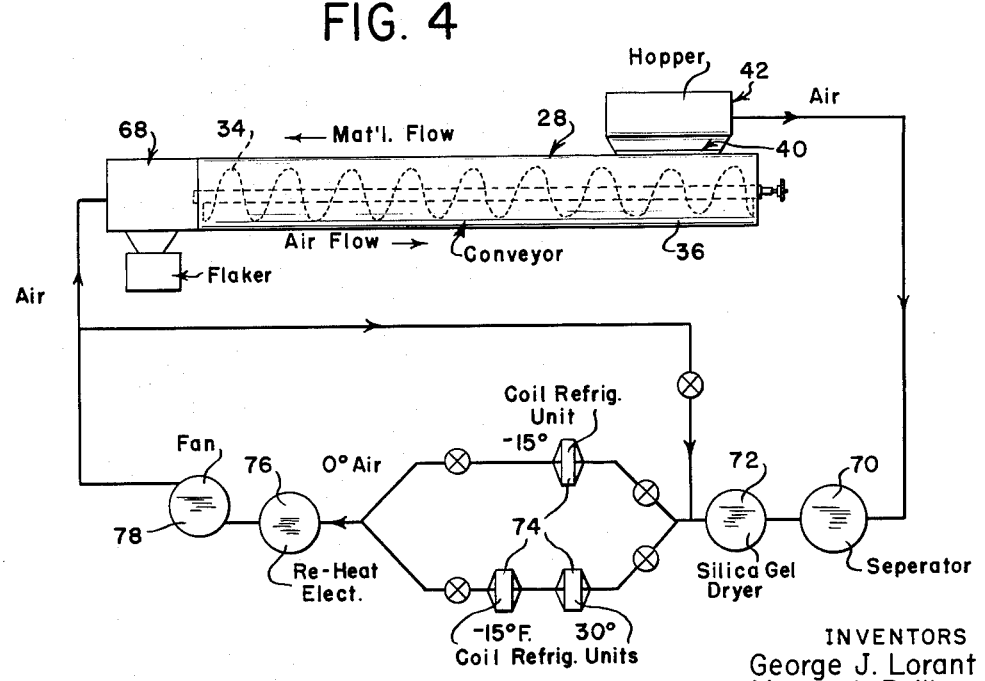
FIGURE 4 is a schematic view of a chilling and flaking apparatus associated with the apparatus of this invention.

The apparatus includes stretch roll 30 which in this embodiment may be a six-inch diameter cylindrical drum adapted to rotate about its horizontal axis in a direction which is the same as the direction of travel of the film leaving drum 22 i.e. in the drawing as shown in FIGURE 3, the roll 30 will rotate clockwise. The axis of rotation of stretch roll 30 is parallel to the axis of rotation of drum 22.

In this embodiment, the cylindrical surface of the stretch roll includes a reticular wrapping of mesh made from expanded metal (or chicken wire) which provides a rough, friction-creating surface to which the film of stretchable material may cling by friction as it passes thereover.

The stretch roll may be provided with appropriate driving means to permit it to rotate sufficiently fast and to have a circumferential velocity sufficiently high to subject the continuous film removed from drum 22 to a tension which is (a) substantially in excess of that required to prevent agglomeration (i.e. to prevent corrugation, compaction, or compression) of the film during removal from the drum 22, (b) sufficiently great to effect stretching of the film, and (c) less than the failing tension of the film. The stretch roll 30 will be associated with driving means not shown which is sufficient to drive the roll at a desired speed in the range of 0.1 to 10.0 r.p.m., subject to the above qualifications.

It is one of the features of this invention that the stretch roll 30 may be driven at the same number of revolutions per minute as the drum 22 or at a faster or a slower number; that it may be mechanically linked to the drum 22; or that it may be independently driven; and further that it may be controlled to be driven at a fixed or at an adjustable speed—all to the end that the proper amount of tension, as herein defined, be provided.

In this embodiment of the apparatus of this invention, a riding wheel, generally designated 32, may be provided. The riding wheel 32, as detailed in FIGURE 1, includes a series of smaller wheels all mounted on a common axis which is mounted on the frame which supports drums 20 and 22 and the tension or stretch roll 30. Each of the riding wheels is adapted to rotate about its axis. The surface of each riding wheel is formed of hard rubber which is characterized by a high coefficient of friction and a degree of resiliency.

Whether the riding wheel 32 is mounted on an axis which is supported on the same framework as the drums 20 and 22 and the roll 30 as shown in FIGURE 1, or is mounted in some other manner as shown more schematically in FIGURE 3, it will be positioned so that the surface of the wheel 32 will firmly and gently touch the surface of roll 30 and thereby facilitate the development of the hereinbefore noted tension in the film which in operation will pass between the stretch roll 30 and the riding wheel 32.

The riding wheel 32 will preferably be resiliently mounted to permit it to firmly and gently touch the film on stretch roll 30, and this resilient mounting may include e.g. spring loaded bearings urging the riding wheel 32 toward stretch roll 30 in the embodiment of FIGURE 1.

As shown in the drawings, the apparatus for treating the product leaving the stretch roll may include a refrigerated conveyor and flaker, generally designated 28. Included therein may be an inclined screw conveyor 34 rotatably mounted within an insulated tube 36 and driven by suitable variable speed motor through gear 38. At the lower end of tube 36, is located port 40 of sufficiently large size to receive the product from stretch roll 30; and port 40 preferably bears a hopper 42. Included within the hopper is preferably an assembly of rotating arms 52 mounted on shaft 54 appropriately rotated.

Tube 28 bears at its upper end, the end furthest removed from the end at which hopper 42 is located, a cold air inlet conduit 60; and at the lower end an air outlet 62. The upper end of tube 36 also bears a hopper 68 which preferably contains therein a flaker for reducing the material leaving the upper end of tube 36 to desired smaller size. This flaking device may include a paddle 64 driven by a gear 66 so as to press the material through an appropriate screen.

Cooling of the material in tube 28 may be effected by means of cool air cooled in a refrigeration circuit. Air may be withdrawn from air outlet 62 (shown in FIGURE 1) and then passed through an air separator preferably of the cyclone type 70, a silica gel air dryer 72, a plurality of indirect heat exchange units of the refrigerated coil type 74, an electrical heating unit 76, and a fan 78 adapted to recirculate the refrigerated dehumidified air to the air inlet 60 and thence in a countercurrent path to the material passing from the drum dryer to the flaker. While silica gel is described as the absorbent material, any one of a number of absorbent materials are contemplated within the scope of operation of such a dryer. The refrigeration units 74 chill the partially dehumidified air to temperatures below freezing in many instances and in so doing condense remaining moisture which has not been removed by the inorganic absorbent materials in the dryer. Following the removal of moisture in the refrigeration unit the substantially dehumidified air is reheated in the heater unit designated by 76 wherein by gradual heating and expansion of the volume of air the relative humidity air is lowered. The thus dehumidified air, which is now not only dry but also hydrophilic because of its partial reheating, is recirculated by means of the blower fan 78 through the system in countercurrent contact with the particles of product.

In accordance with a specific example of a process employing the apparatus of the instant invention, a pear puree (to which had been added 3% by weight of tapioca starch) having a moisture content of 86% to 88% was fed to a pool of pear puree maintained at the pinch of a double drum dryer. Clearance between the drums was 0.007 to 0.008 inch. The rolls 20 and 22 of the dryer were 24 inches in diameter and each had an effective heating surface (chrome plated) of about 25 square feet. Steam was admitted to the interior of the drums at 20 p.s.i.g. and the drums were rotated at 0.8 r.p.m. The puree formed a film on the drum and as the hot drum rotated, the film was dehydrated to about 2.5% to 5% moisture. After traversing about 220° of the drum surface, the film of material was removed from the drum by a doctor blade (at point 24 thereof) which was positioned substantially tangentially to the surface of the drum. The removed film passed substantially horizontally a short distance to the stretch roll. During its brief time of passage, it cooled only slightly and it was stretchable or plastic.

The doctored film was passed over a 6-inch diameter stretch roll 30 having a foraminous surface formed of expanded metal. The stretch roll was rotated at 1.33 r.p.m. and the sheet or film of pear puree was stretched as it passed thereover. A riding wheel 32 gently and firmly pressed on the film as it passed over the stretch roll 30 and insured a positive and uniform maintenance of the tension.

The product pear puree film had a sheet thickness of about 0.005 to 0.007 inch (unit weight 6.55 g. per square foot) and was characterized by a discontinuously ruptured surface. The so-stretched film was passed downwardly into stretch roll hopper 42 containing breaker arms or fingers 52 integrally mounted on shaft 54 which broke up the film into smaller sized pieces which then passed into insulated tube 36 containing screw conveyor 34. Here the dried puree was contacted by dry air flowing downwardly through the screw conveyor as the pieces moved upwardly therethrough under the influence of the screw conveyor.

The material left the srew conveyor at its upper end and it passed into the flaker which included rotating paddles 64 (driven by suitable means not shown) which may gently press the pear puree pieces through the holes in a screen to permit attainment of the product in the desired size.

The dehydrated pureed product obtained by use of the apparatus of the instant invention is particularly characterized by its substantially immediate to 5 seconds rehydration on contact with liquid to give a desirable puree.

It will be apparent to those skilled-in-the-art that use of the novel apparatus of this invention, which provides a simple means for creating and maintaining a controlled tension and thereby permits controlled stretching a film almost to its point of failure, makes possible the continuous and uninterrupted production of a novel product which possesses unexpectedly superior properties.

Although the instant invention has been described with reference to certain specific examples, it will be apparent to those skilled-in-the-art that various changes and modifications may be made thereto; and that these changes and modifications will fall within the scope of this invention.

What is claimed is:

Apparatus for removing and cooling a continuous layer of tomato paste or the like from the surface of a drying drum revolving about a horizontal axis, comprising a doctor blade in contact with said drum surface, a traction cylinder mounted on the doctor blade side of said drum parallel with said doctor blade and having its periphery formed to provide a traction face adapted to engage frictionally the layer draped over said traction cylinder to provide tension in the section of said layer between said drying drum and traction cylinder, means for driving said traction cylinder at a suitable speed in relation to said drying drum to effect tension in said section of said layer between said drying drum and traction cylinder, and a plurality of rolls each rotating about an axis parallel with the axis of said traction cylinder arranged along the descending side of said traction cylinder and bearing against the descending layer on said friction cylinder to increase the grip of said traction face on said layer.

References Cited by the Examiner
UNITED STATES PATENTS

| | | | |
|---|---|---|---|
| 719,238 | 1/03 | Loomis | 18—10 X |
| 1,988,787 | 1/35 | Fowler | 18—10 |
| 2,352,220 | 6/44 | Overton | 159—10 |
| 2,391,033 | 12/45 | Northcutt et al. | 159—11 |
| 2,413,779 | 1/47 | Ormond | 159—11 |
| 2,957,200 | 10/60 | Pufahl et al. | 18—9 |

WILLIAM F. O'DEA, *Acting Primary Examiner.*

BENJAMIN BENDETT, CHARLES F. O'CONNELL, *Examiners.*